Dec. 29, 1925.
R. G. MILLER
1,567,667
INSTRUMENT FOR TEACHING TELEGRAPHY
Filed Feb. 27, 1922
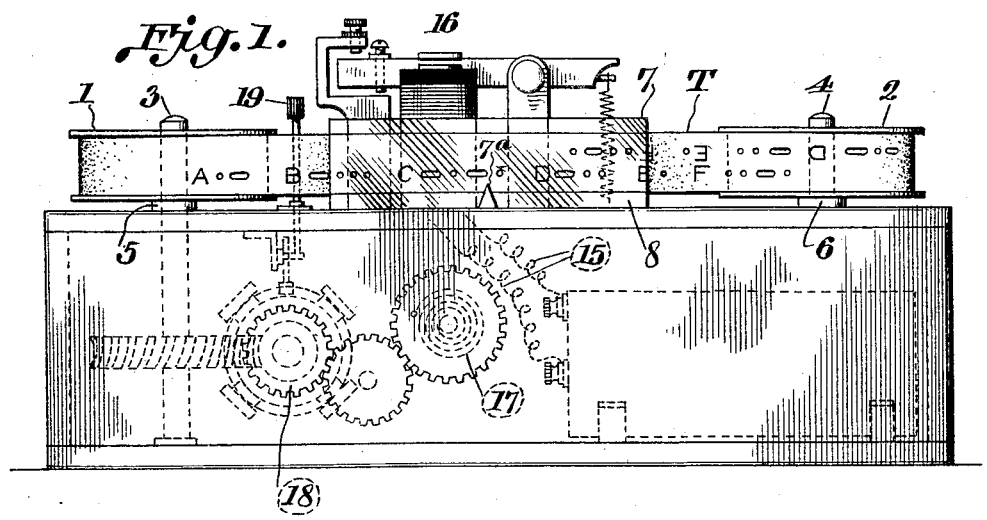
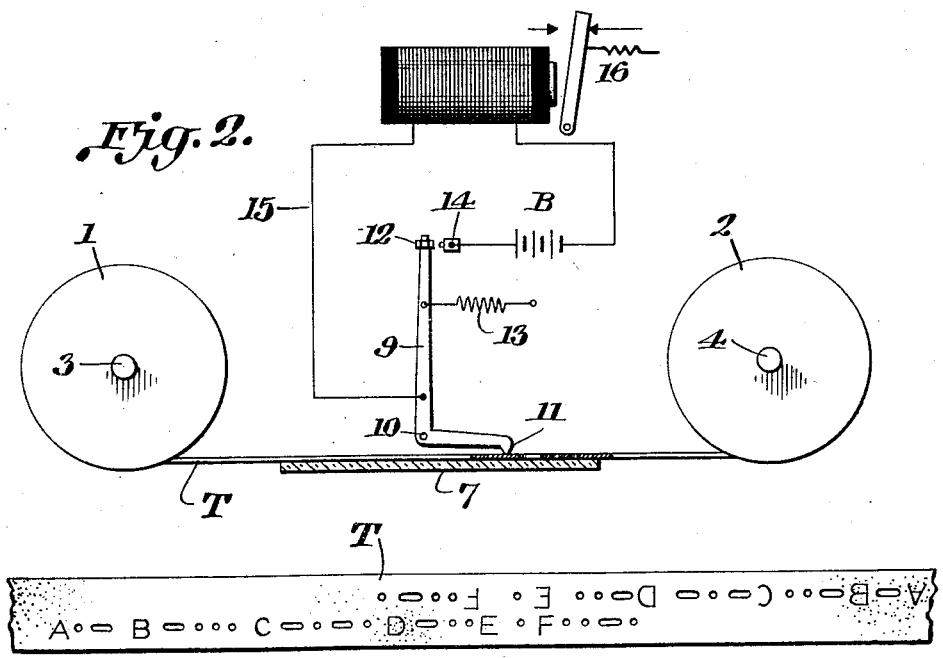
Inventor
Ray G. Miller
By Clarence A. Bateman
His Attorney Patented Dec. 29, 1925.

1,567,667

UNITED STATES PATENT OFFICE.

RAY G. MILLER, OF WEST ENGLEWOOD, NEW JERSEY.

INSTRUMENT FOR TEACHING TELEGRAPHY.

Application filed February 27, 1922. Serial No. 539,543.

*To all whom it may concern:*

Be it known that I, RAY G. MILLER, a citizen of the United States, residing at West Englewood, in the county of Bergen and State of New Jersey, have invented new and useful Improvements in Instruments for Teaching Telegraphy, of which the following is a specification.

The present invention relates to apparatus for teaching telegraphy and the primary object thereof is to provide a relatively simple and inexpensive device by the aid of which telegraphy may be learned quickly and inexpensively, and moreover, the necessary practice is afforded students in receiving messages at different speeds according to the state of proficiency of the student.

The invention is applicable to the teaching of ordinary telegraphy or wireless telegraphy and also to the teaching of the Morse, continental or any other code.

To these and other ends, the invention consists in certain improvements and combinations and arrangements of parts, all of which will be hereinafter more fully described, the features of novelty being pointed out particularly in the claims at the end of the specification.

In the accompanying drawing:—

Figure 1 is a front elevation of an apparatus constructed in accordance with the present invention;

Figure 2 is a diagrammatic view in top plan, of the instrument shown in Figure 1; and Figure 3 represents a section of one of the instruction tapes adapted for use in carrying out the invention.

The apparatus as shown in the present instance comprises a pair of spools 1 and 2 removably mounted on shafts 3 and 4 supported at a suitable distance apart in appropriate bearings 5 and 6. Between the spools is located a suitable platen 7 which is preferably of glass or other transparent material suitably mounted on a support 8. Opposite to the platen is arranged a contact member 9, this member being pivoted at 10 and provided at one end with a point or stylus 11 and at its opposite end with an electrical contact 12; and a pointer 7ᵃ may be provided to indicate the point where the stylus engages the tape, to be hereinafter described. A tension spring 13 acts to move the point or stylus 11 toward the platen and to move the contact 12 toward a cooperating or relatively fixed contact 14. The member 9 and its contact 12 are connected in one side of an electrical circuit 15 which includes a battery or other source of current supply, designated B, and this circuit also includes a telegraph sounder 16 when ordinary telegraphy is to be taught or a buzzer when wireless telegraphy is to be taught, opening and closing of this circuit being controlled by the contacts 12 and 14.

A tape or ribbon T is employed, the ends thereof being wound on the spools 1 and 2. This tape is composed preferably of a strip of heavy waxed paper, letters of any telegraph code to be taught being suitably recorded thereon, it being preferable to record the letters of the code by perforations through the tape, the lengths of the perforations and the spacing between them corresponding to the dots and dashes and the spacing between in the usual codes. It is also preferable to precede the perforations representing each letter with the printed letter itself which may be printed directly on the imperforate portion of the tape immediately preceding the perforations for that letter, as is shown in Figure 2.

The tape bearing the telegraph code passes behind the platen 7 and the point or stylus of the member 9 is pressed forwardly or against the tape. The code perforations in the tape move in a path alined with the stylus, and as each perforation in the tape comes into register with the stylus, the latter moves forwardly toward the platen, under the action of the spring 13, thus engaging the contacts 12 and 14, and as the imperforate portions of the tape engage the stylus, the contacts 12 and 14 are disengaged, in consequence of which the make and break contacts 12 and 14 will operate to cause the letters of the tape to be audibly reproduced by the sounder or buzzer, just as the letters of a code actually transmitted by ordinary or wireless telegraphy are received and audibly reproduced. By using a glass or other suitable transparent material for the platen, the printed letters designating the perforations corresponding therewith can be readily and correctly read by the student, this being particularly helpful to the beginner.

The tape winding spool is advanced, preferably at a constant rate of speed, by any suitable means, as for example a spring motor 17 which may be connected to drive the shaft 3, and a suitable governor 18 which may be of the well known ball or centrifugal type is preferably provided to maintain a constant speed, and the governor may be provided with a regulator 19 to set the speed of the tape as desired or according to the proficiency of the student.

In order to save time and also simplify the apparatus, the tape is preferably provided with two rows of perforations reading from the opposite ends thereof, and the spools 1 and 2 are removable and reversible on the shafts 3 and 4. By this construction, when the tape has reached the limit of its movement in one direction, using one line of perforations, the spools can be reversed on the shafts and the tape can then be advanced in the opposite direction, bringing the other line of perforations into use, thus avoiding the necessity of separately rewinding the tape.

Different tapes can be provided according to the proficiency of the student and the code to be taught. Tapes for beginners preferably comprise the alphabet and the letters thereof repeated a suitable number of times, and the letters accompanied by the written or printed letter or character represented by the perforations, this enabling the student to read the written or printed letter while the sounds corresponding thereto are reproduced by the sounder or buzzer, and to thus familiarize himself quickly and thoroughly with the different letters. Other tapes with the written or printed letters omitted therefrom may be used as the student advances in his study, and these tapes may include messages of the different kinds commonly used. For more advanced study and practice for newspaper work an abbeviated code such as the commonly used Phillipps code may be used on the tapes, and the range of speed afforded by the instrument will afford the proper practice for the beginner, or for the student of rapid or newspaper work and any intermediate speeds which may be gradually increased as the student becomes more proficient. The instrument enables all branches of telegraphy to be taught easily, quickly, inexpensively and without requiring the services of an instructor.

I claim as my invention:—

1. A device for teaching telegraphy comprising, in combination, a tape bearing impressions corresponding to characters of a telegraphic code, means for advancing the tape, a window past which the tape is movable and through which the impressions on the tape are visible, a reproducer, and a stylus cooperative with the portion of the tape opposite to the window and controlled by the code impressions therein for causing operation of the reproducer in accordance with the code impressions in the tape, said window providing a platen against which the stylus presses the tape and through which that portion of the tape engaged by the stylus is visible.

2. A device for teaching telegraphy, comprising, in combination, an endwise movable tape having a row of impressions corresponding to characters of a telegraphic code, a reproducer for the code characters on the tape, a platen past which the tape is movable and through which the code impressions on the tape are successively visible and means including a stylus cooperative with the portion of the tape passing the platen and controlled by the code impressions thereof for causing operation of the reproducer in accordance with the code characters of the tape.

3. A device for teaching telegraphy comprising, in combination, a tape bearing code impressions, means for moving the tape endwise, a transparent platen past which the tape is movable and through which the code impressions thereon are visible, a reproducer, and means including a stylus bearing against the tape opposite to the platen and controlled by the code impressions thereof to cause operation of the reproducer in accordance with such impressions.

4. A device for teaching telegraphy comprising, in combination, a tape bearing code impressions, variable-speed means for moving the tape at different desired speeds, a reproducer, means including a transparent platen for rendering the code impressions on the tape successively visible, and means including a stylus pressed against a portion of the tape opposite to the platen and controlled by the code impressions of the tape to cause operation of the reproducer in accordance with such code impressions.

5. A device for teaching telegraphy comprising, in combination, a tape bearing a plurality of lines of code impressions reading respectively from opposite ends of the tape, a pair of spool supports, one of which is provided with means for driving it, a pair of spools having the respective ends of the tape attached thereto, said spools being adapted for reversible mounting on said spool supports whereby the tape may be caused to move endwise alternately in opposite directions, and means controlled by the tape for reproducing the code characters in accordance with the code impressions of the tape.

6. A device for teaching telegraphy comprising, in combination, a tape bearing code impressions, means for advancing the tape endwise, a transparent platen past which the tape is movable and through which said code impressions are visible, a stylus bearing on the tape opposite to the platen, an electrical circuit including contacts controlled by the stylus, and a reproducing device connected in said circuit and controlled by said contacts and operative in accordance with the code impressions in the tape.

7. An instrument of the class described comprising a transparent platen, a tape bearing a line of impressions corresponding to the characters of a telegraph code and also bearing the corresponding written characters adjacent to the respective code impressions, means for supporting and advancing the tape past said platen, and means for reproducing the code impressions on the tape including a stylus having means for holding it in cooperative relation with such code impressions, the code impressions and written characters on the portion of the tape engaged by the stylus being visible through the transparent platen.

8. An instrument of the class described comprising means for supporting and continuously advancing a tape bearing code impressions, a platen past which the tape is movable, an electrical circuit including a reproducing device, and means controlled by the tape for causing operation of the reproducing device in accordance with the code impressions on the tape embodying a movably-mounted contact arm carrying at one end a stylus, said arm having a spring which yieldingly presses the stylus against the surface of the platen and against the surface of the tape opposite to the platen and thus controls the movements of said arm in accordance with the code impressions of the tape, said arm also carrying a contact which is connected in said circuit, and a second contact also connected in said circuit and engaged and disengaged by the contact on the contact arm in accordance with the movements of said arm in consequence of the passage of the code impressions of the tape past the stylus.

9. An instrument of the class described comprising a pair of spools having wound thereon the ends of a tape bearing telegraphic code impressions, means including a governor for rotating one of the spools at a constant speed to impart longitudinal movement to the tape, a reproducer, and means controlled by the code impressions of the moving tape for causing operation of the reproducer in accordance with such code impressions.

In testimony whereof, I affix my signature.

RAY G. MILLER.